Figure 1:
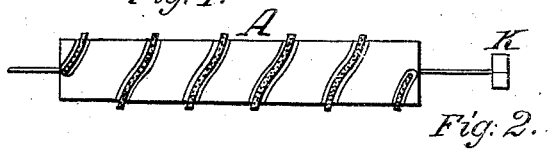

J. Dyson.
Carding Engine.

Nº 6,135. Patented Feb. 20, 1849.

UNITED STATES PATENT OFFICE.

JEPTHA DYSON, OF FULTON, SOUTH CAROLINA.

IMPROVEMENT IN CARDING-ENGINES.

Specification forming part of Letters Patent No. 6,135, dated February 20, 1849.

*To all whom it may concern:*

Be it known that I, JEPTHA DYSON, of Fulton, in the district of Sumter and State of South Carolina, have invented a new and useful Improvement in Carding-Engines commonly employed in cotton or woolen factories, for the purpose of stripping and clearing the main cylinder of such carding-engines while running, by a self-acting contrivance, of which the following is a full and exact description.

The principle of the above improvement consists in the employment of two cylinders surrounded or clothed with teeth of metal in the form of wire, or other forms adapted to the end in view, mounted with proper journals on suitable bearings below the main cylinder of the carding-engine at any convenient point between the feeder or licker and the doffer-cylinder and driven by the main or other shafts of the carding-engine, and so adjusted as to operate upon the surface of the main cylinder and upon the surface of each other, and to strip and clear the main cylinder to the extent required and return the strippings to the main cylinder to be carded over and delivered to the doffer-cylinder, it being a leading principle in the said improvement to adjust the number or quantity of teeth in the stripping or clearing cylinders in such way as to cause it to remove the strippings in such limited quantities in each revolution of the main cylinder as will always enable the latter to deliver a sufficient amount of the carded material to the doffer-cylinder and with due regularity.

To enable others to make and use the invention aforesaid, the following description and specifications are offered:

First. I construct a cylinder of wood or metal—one or both—of a convenient size to form what I term the "stripper" or "clearer"— say from three to six inches in diameter, and of a length equal to that of the main cylinder— having it turned perfectly true and suitably prepared for receiving the teeth of metal in the form of wire or any other form desired and adapted to the end in view. If teeth of wire are employed, I prepare a narrow fillet of leather and insert therein one, two, or more rows of teeth, of the usual form and size of card-teeth, or coarser, if desired. This fillet of wire teeth is fastened at one end of the cylinder and carried spirally round the cylinder and fastened at the opposite end, being secured throughout the intermediate space by tacks or otherwise, thus forming a perfectly regular spiral fillet of teeth around the whole length of the cylinders, as shown in the drawings, A, Fig. 3, in the annexed drawings.

Second. The cylinder A, above described, thus furnished with the spiral fillet of wire teeth and ground and sharpened after the manner of card-cylinders, is next mounted with proper journals, in suitable bearings, under the main cylinder C, at any convenient point between the feeder or licker E and the doffer-cylinder D, and in a parallel direction with the main cylinder C, as shown in the annexed drawing, Fig. 2. The teeth of the spiral fillet being set as near those of the main cylinder as possible, without touching and pointing in an opposite direction to those of the latter, are also made to revolve in an opposite direction to it, and at a speed causing the surface of the teeth or periphery of the stripper A to outrun the surface or periphery of the main cylinder C about one-sixth or one-fifth, if so much be necessary.

Third. I also construct another cylinder B, which I term the "receiver and forwarder," of about the same dimensions as the stripping-cylinder A, and clothe it with card-fileting of the same description as usually employed for small cylinders of carding-engines and in the same way, with the teeth set in an opposite direction to those of the main cylinder, which, being ground and sharpened in the usual manner, is mounted with proper journals in suitable bearings under the main cylinder C and immediately in advance of the stripper A and parallel thereto and in the direction of the licker E, as shown in the drawings, Fig. 2, the surface of the teeth being set as near the surface of those of the main cylinder C and of those of the stripper A as may be without touching, and made to revolve in the same direction as that of the main cylinder C, or in an opposite direction, as may be most convenient, but at a speed greatly below it.

Fourth. In lieu of the narrow fillet of wire teeth on the stripper or clearer A, I propose to employ thin and narrow strips or fillets of iron plate or other metals secured edgewise on the surface of the cylinder A in a spiral form or in segments of any required length, with teeth formed on the outer surface or periphery thereof, or to employ teeth in any form adapted to the end in view, fixed on the surface of the cylinder A in an isolated form and so few in number or quantity as not to strip the main cylinder to excess and prevent its delivery of the carded material to the doffer D in sufficient quantity; or, in lieu of teeth formed as above, to employ straight wire teeth, forming radii, or nearly so, to the center of the cylinder A, to act as a brush to clear the main cylinder C, with or without the intervention of the cylinder B.

Figure 2:
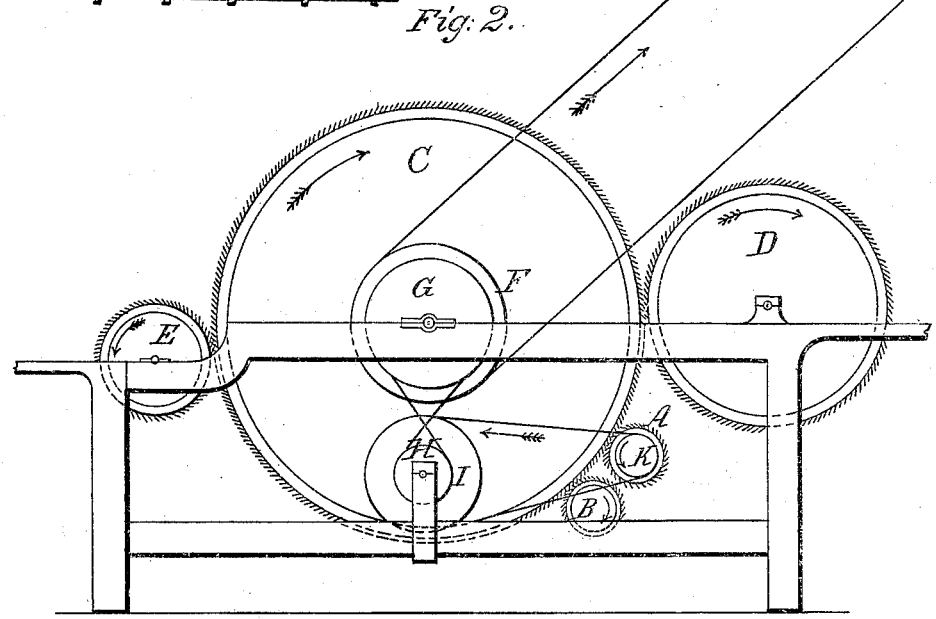
Figure 3:
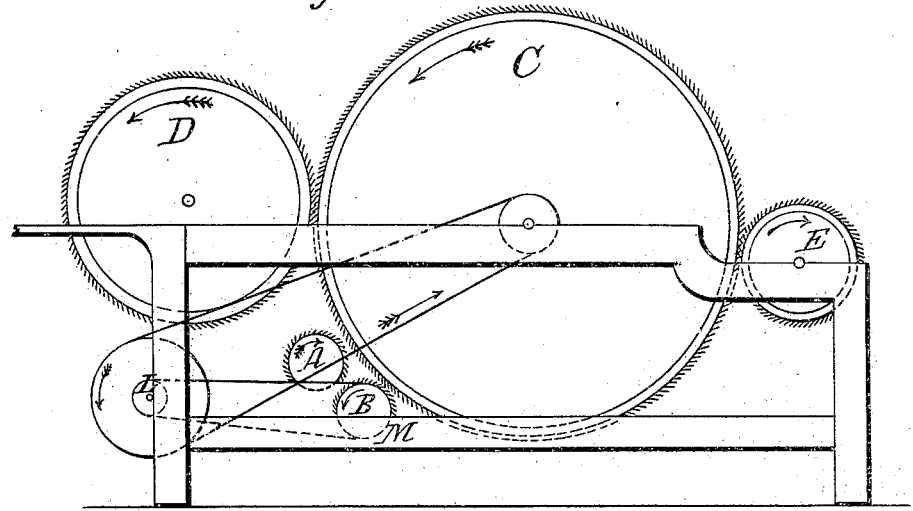

Fifth. The invention and improvement herein described being capable of application to most carding-engines now in use as well as those to be constructed, I propose the following method or plan of driving and operating the same. On the shaft of the main cylinder C and immediately behind the driving-pulley F, Fig. 2, is fixed the pulley G, driving the small pulley H by a narrow cross-belt; or light gearing of corresponding proportions may be employed. On the same axis on which the small pulley H is mounted a larger pulley I is also fixed, which by a narrow open belt drives the pulley K on the end of the shaft of the stripper A, as shown in the annexed drawings, the relative sizes of all being so adjusted as to drive the stripper A at the required speed. On the opposite side of the carding-engine, as shown in Fig. 3, the small pulley L is fitted on the end of the shaft, holding the pinion which drives the doffer-cylinder. This pulley L by an open belt drives the pulley M, fitted on the end of the shaft of the receiving and forwarding cylinder B, as shown in the drawings annexed.

What I claim as my invention, and desire to secure by Letters Patent, is—

1. The cylinder A, surrounded or clothed with a spiral fillet of metal teeth in form of wire, or with teeth of metal of the form and description mentioned and described in the fourth specification as arranged and employed in the third and fourth specifications in combination with the main cylinder C and with the cylinder B, or with the main cylinder only, to strip and clear the latter by a self-acting contrivance while the carding-engine is in operation.

2. The cylinder B, in combination with the cylinder A and the main cylinder C, as applied to receive the strippings from the former and to deliver them to the latter.

December 16, 1847.

J. DYSON.

Witnesses:
R. M. DYSON,
JAMES M. PLUMER.